Figure 1:
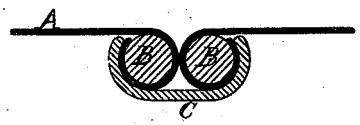

J. P. ONDERDONK.
UMBRELLA.

No. 174,430. Patented March 7, 1876.

Witnesses:
W. R. Wright.
J. J. Janeway

Inventor:
Jno. P. Onderdonk
by J. Bonsall Taylor
Attorney.

UNITED STATES PATENT OFFICE.

JOHN P. ONDERDONK, OF PHILADELPHIA, PENNSYLVANIA.

IMPROVEMENT IN UMBRELLAS.

Specification forming part of Letters Patent No. 174,430, dated March 7, 1876; application filed January 29, 1876.

*To all whom it may concern:*

Be it known that I, JOHN P. ONDERDONK, of the city and county of Philadelphia, in the State of Pennsylvania, have invented a new and useful improvement in the method of making up the coverings of umbrellas or parasols, and attaching the same to the frame, of which I declare the following to be a full, clear, and precise description.

My invention relates to the art of umbrella manufacture; and has for its object the simplifying and cheapening of the present methods of making up the covering and attaching it to the frame. Coverings are ordinarily made up from several pieces of material, in shape sectors of any given, but of uniform, dimensions, and varying in number with the number of the ribs, which pieces or sectors are united by stitching, pasting, or like methods, upon their lateral edges, the radii of the sectors, so as to form one complete covering, which is then either sewed direct to the frame, or attached by means of twine passing through the covering, and through holes in the ribs, or by means of hooks and rings, or the like devices.

To obviate the labor and expense of fitting and stitching together the sectors of covering, (which must, perforce, be very exact, laborious, and costly work,) and, co-existently and co-operatively with the same, to create a simple method of attaching the coverings made up in the manner hereinafter described, with the purpose above in view, to the frames, are the specific objects of my invention; to which ends it consists, first, in attaching the previously-cut-out sectors of covering, at one and the same time, together and to the frame, by clamps, clutches, catches, springs, teeth, or wires, without sewing or pasting.

It further consists of a duplex rib for umbrellas or parasols, composed of two parts, between and around which the edges of the sectors of covering pass or are wrapped, by which they are neatly and effectively attached together, and to which they are secured by elastic or forced pressure exerted by the ribs, or by clamps around the ribs, or by tongues, teeth, or points upon one part taking into corresponding grooves, seats, or depressions upon the other, whose action is either to perforate, wedge, or otherwise retain the sectors.

It further consists of the clamp-rib D, hereinafter described.

It consists, finally, of the combination of a duplex rib with a clamp, to secure the covering of an umbrella or parasol.

In the drawings, which are all cross-sections illustrative of various modifications of my invention, A represents the covering of the umbrella; B B, different forms of my double rib, and C the clamp or clutch used in certain of the forms to hold the double rib firmly together.

For the better information of the public, I will proceed to describe the construction of the various modifications of my invention with reference to the drawings.

Figure 2:
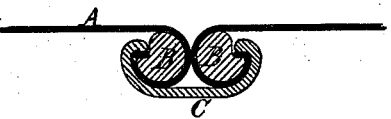
Figure 3:
Figure 4:
Figure 5:
Figure 6:
Figure 7:
Figure 8:
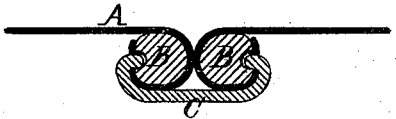

In Figure 1 the ribs are represented as of circular section, with the covering simply wrapped around them, and a spring or other clamp around the whole. In Fig. 2 the arrangement is similar, but slots or grooves are worked in the ribs to form seats for the teeth of the clamps. In Fig. 3 one rib is inside, and the other outside, of the covering, the inside being gutter or channel shaped, while the outside is smaller, and either stretched or sprung into the other, securing the covering between the two by compression. This form I employ as an intermediate rib, when there are a less number of sectors than the number of ribs employed, because of its simplicity and general efficiency. In Fig. 4 a long gutter-shaped clamp, D, alone forms the rib, and, being squeezed up, secures the covering within itself without auxiliary device. In Fig. 5 the inner edges of the ribs are tongued and grooved, their section being either blunt or wedge-shaped. In Fig. 6 one rib is provided with spears, points, pins, or studs, and the other with corresponding holes or depressions, in which arrangement the covering is pierced, and so held between them. In Fig. 7, which is a modification of Fig. 6, the point does not perforate the covering, but merely jams or wedges it, the clamp securing the whole. The point in this special form is readily made by punching the rib with an awl or punch, whereby the point and corresponding hole are both made at once on different sides of the same rib. In Fig. 8 a modification of Fig. 2 is represented, the teeth of the clamp piercing the covering upon the outside of the rib, and penetrating into holes or depressions in the rib.

The materials of which the ribs may be composed are various; and the clamps may be of any number and form, elastic to spring on, or malleable to be bent into position. The double ribs may be jointed to the stick in any convenient manner, and pointed and held together at their free extremities by any suitable point or tip; and any less number of sectors than ribs may be employed, so that it may be even convenient to cut the whole covering out in proper curvature of one piece, and unite it at a single point by my double rib and clamp, using intermediately any method of attaching desired and ordinary ribs, or the rib and method shown in Fig. 3.

The advantages are, the ease and rapidity with which the covering can be attached or removed, the avoidance of all stitching or pasting, and great durability.

I do not propose to limit myself to any precise form or material, but claim, and desire to secure by Letters Patent of the United States—

1. An umbrella or parasol the sectors or portions of the covering of which are attached to each other and to the frame by clamps, clutches, catches, springs, teeth, or wires, substantially as described.

2. A duplex rib for umbrellas or parasols composed of two parts, between which the covering passes, and to which it is secured by elastic or forced pressure, or by tongues, teeth, or points upon one part taking into corresponding grooves, seats, or depressions upon the other, substantially as described.

3. The clamp-rib D, (shown in Fig. 4 of the drawing,) as and for the purpose specified.

4. The combination of a duplex rib, B, with a clamp, C, to secure the covering of an umbrella, substantially as shown and described.

In witness whereof I have hereunto signed my name before two subscribing witnesses.

JNO. P. ONDERDONK.

Witnesses:
EDWIN J. HOWLETT,
CHAS. D. WASHBURN.